G. E. THUM AND M. THEIMER.
TELEPHONE BOOTH CONTROLLER.
APPLICATION FILED JAN. 19, 1918.
1,337,858.
Patented Apr. 20, 1920.
2 SHEETS—SHEET 1.
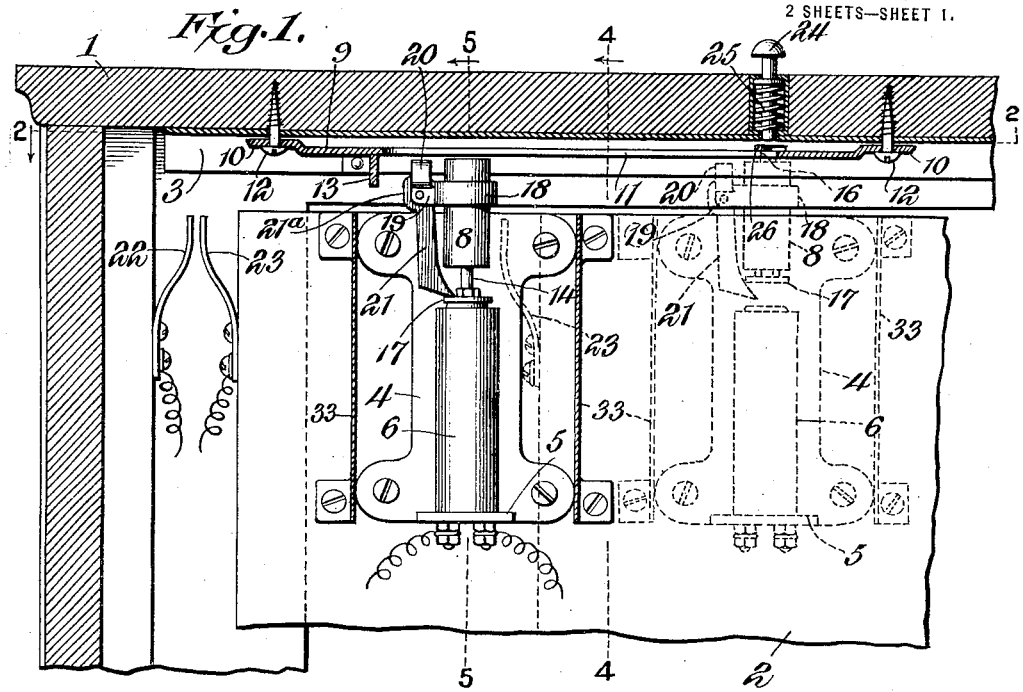
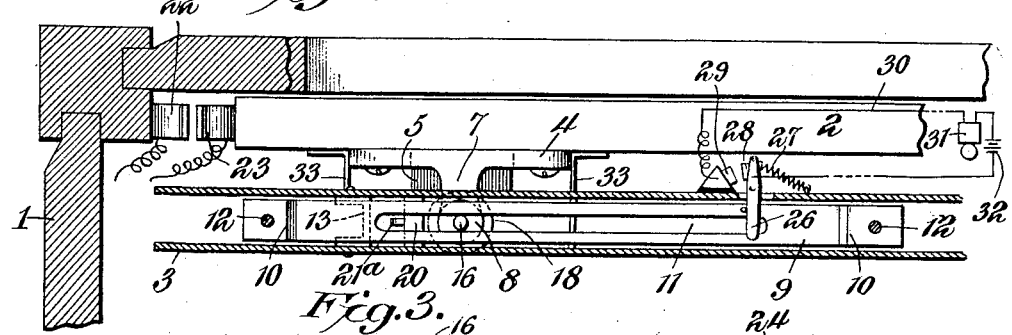
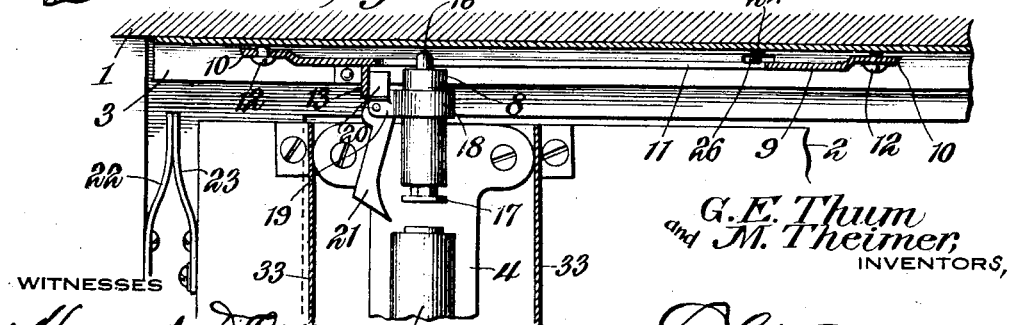
G. E. Thum
and M. Theimer,
INVENTORS
WITNESSES
ATTORNEY

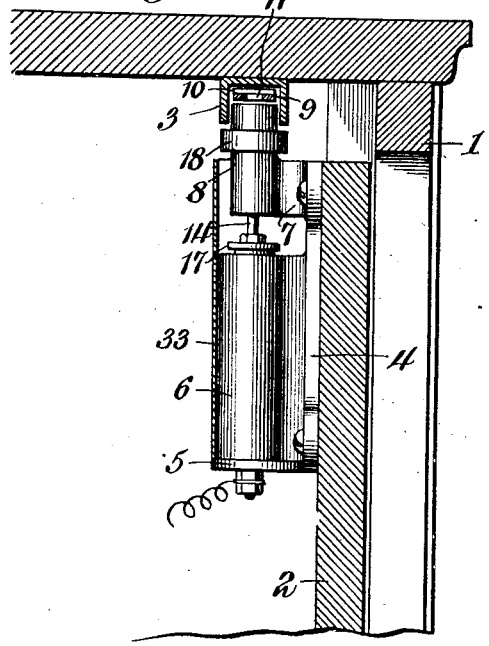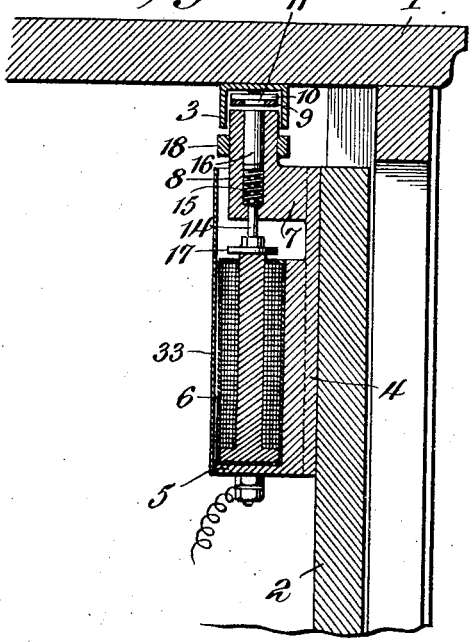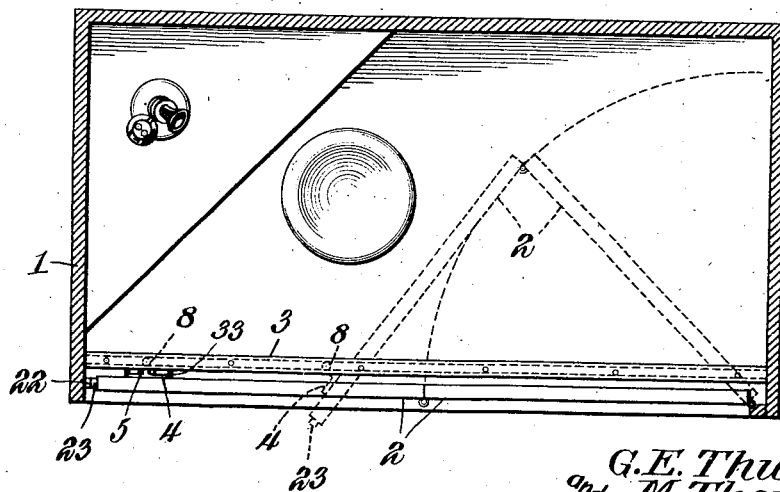

UNITED STATES PATENT OFFICE.

GEORGE ERNEST THUM AND MAX THEIMER, OF ELIZABETH, NEW JERSEY.

TELEPHONE-BOOTH CONTROLLER.

1,337,858.

Specification of Letters Patent.  Patented Apr. 20, 1920.

Application filed January 19, 1918. Serial No. 212,723.

*To all whom it may concern:*

Be it known that we, GEORGE E. THUM and MAX THEIMER, citizens of the United States, residing at Elizabeth, in the county of Union and State of New Jersey, have invented a new and useful Telephone-Booth Controller, of which the following is a specification.

This invention has reference to controllers for telephone booths, and its object is to provide means whereby the booth door will be locked in the closed position after a customer has entered the booth and has used the telephone, thus holding the customer as a prisoner in the event of failure or refusal to pay the charges.

It sometimes happens that a customer will maliciously attempt to evade paying the proper charges, and again will question the charges and refuse to pay them, such customer sometimes objecting to the Government tax upon telephone messages and will try to evade paying the same.

The invention has to do with public booths where no attendant is present and where the entire transaction is carried on through a central operator. The invention contemplates devices whereby not only is the booth door locked in the closed position, and must be closed in order to complete the telephone circuit, but the customer is held within the booth until the central operator releases the door for opening, although provision is made for a slight opening of the door to insure ventilation while the imprisoned customer is awaiting the arrival of an authorized person notified either automatically or by the central operator. The customer may be released from the booth either by the central operator or by someone in the neighborhood of the booth who is familiar with the local means for such release.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is an elevation of a small section of a booth with the latter in vertical section;

Fig. 2 is a section on the line 2—2 of Fig. 1;

Fig. 3 is a view similar to Fig. 1, but showing a different phase in the operation of the apparatus;

Fig. 4 is a section on the line 4—4 of Fig. 1;

Fig. 5 is a section on the line 5—5 of Fig. 1;

Fig. 6 is a horizontal section of a telephone booth having a folding or sliding door provided with the improved controller.

Referring to the drawings, there is shown a small portion of a telephone booth 1 which may follow the usual lines of such booths, and needs no special description. Such booths are provided with doors 2 of folding, sliding or other type. The doors are supported in any appropriate manner in accordance with the particular type, and on the ceiling of the booth adjacent to the door opening there is secured a channel 3 usually of metal, such channel being provided for guiding the upper edge of the door structure on its closing and opening movements.

So far as has been described, the door structure may be such as is customarily employed, the ordinary construction permitting the attachment of the invention to the door.

Near the outer edge of the door there is secured a plate 4 serving as a support for different parts of the invention. At that end of the plate 4 constituting its lower end is a shelf 5 on which is mounted an electromagnet 6, and at what constitutes the upper end of the plate there is a projecting web 7 terminating in an upstanding block or pin 8 rising to a sufficient height above the top of the door to enter the channel strip 3 so as to serve as a guide and pivot for the corresponding end of the door. So far as the guiding pin 8 is concerned, it may, in serving as a guide for the door, function similarly to guiding pins employed on doors of existing booths, but the pin 8 has other functions not present in existing booths. Near that end of the booth occupied by the outer end of the door when the latter is in the closed position, there is located within the channel 3 an elongated strip 9 having bent ends 10.

The strip 9 is provided with a longitudinal slot 11 between the ends 10 and of sufficient length for a purpose to be described. The strip 9 is held in the channel 3 by screws 12 or in any other suitable manner, so that the strip may have a small up and down play to prevent jamming of parts and to compensate for any irregularity of fit. The strip 9 has on what constitutes its under face in the installed position a stop 13 in the path of parts carried by the pin 8 and to be hereinafter described.

The pin 8 is centrally and longitudinally bored for the passage of a rod 14 free to move lengthwise of the pin 8 in an up and down direction, but constrained to a rising movement by a spring 15 surrounding the rod within the pin 8 and bearing against a head at the upper end of the rod, said pin 8 being longitudinally counterbored for the purpose. A lock bolt 16 is located in the pin 8 above and engaged by the headed end of the rod 14. The bolt 16 is of a size and so located as to freely pass into the slot 11 under circumstances to be described.

At the lower end of the rod 14 is an expanded head 17 constituting an armature for the core of the magnet 6. When the rod 14 is under the control of the spring 15, the bolt 16 is projected above the pin 8 and into the slot 11 when registering with said slot. Under such circumstances, the door 2, which may be nearly or quite closed, can be opened for a short distance, depending upon the length of the slot 11, but at no time is this opening large enough to permit a person to leave the booth or to enter the latter. The extent of opening of the door under such circumstances is intended for ventilating purposes, and not for entrance to or exit from the booth. When the magnet 6 is energized, the armature 17 is attracted, the spring 15 is compressed, and the bolt 16 drops by gravity from the slot 11 if previously therein.

Carried by the pin 8 but capable of moving around the pin, is a collar 18 having an arm 19 radiating therefrom and terminating in a laterally expanded head 20 capable of traveling in the channel 3. Mounted on the arm 19 is a gravity dog or latch 21 having a tendency to swing over the magnet 6 and to come to rest under the action of gravity immediately over the head or armature 17 when the latter has been drawn into engagement with the magnet 6 by the energization of the latter. The stop member 13 is in the path of the head 20 so that when the door reaches the closed position, the head 20 is engaged by the stop member 13. Also the upper end or shorter arm 21ª of the dog 21 is engaged by the member 13 and the lower end or nose of the dog 21 is swung to one side of the magnet, thus releasing the armature 17 and permitting the rod 14 to rise under the action of the spring 15 until the bolt 16 enters the slot 11, thus effectively locking the door 2 from being opened except for the short distance permitted by the length of the slot 11.

Included in the telephone circuit are two contact springs 22 and 23, one being on the door jamb and the other on the door, so that when the door is in the closed position the telephone circuit may be completed through the contacting springs 22 and 23. Of course, other forms of contact may be used. The purpose is to make it possible to carry on conversation in the ordinary manner only when the door has been completely closed, and the actuation of the latch pawl 21 effected to release the rod 14 to cause the lock bolt 16 to enter the slot 11 in the strip 9, the said strip serving as a keeper.

If the customer desires to have a telephone conversation with somebody, the booth is entered and the door closed, whereupon central is apprised of the conditions in the customary manner, connections are made, and the conversation proceeds. Central then apprises the customer of the charges, and on the deposition of the necessary amount in the coin slots provided, central causes the energization of the magnet 6 and the prompt release of the customer. It is quite feasible to employ the usual ringing circuit for the energization of the magnet 6 by central, so that no external wiring is needed.

Should the customer question the charges, or perhaps attempt to leave the booth without paying the charges, the booth door will be found to be locked and the customer becomes a prisoner until either the charges are paid or central notifies the proper official who visits the booth.

At the present time, there is a Government tax upon certain telephone messages, and a refusal to pay becomes an offense against the Government, thus justifying the temporary imprisonment of the customer.

In order that the customer may be released by an authorized person in the neighborhood, a push pin 24 is mounted in the ceiling or top of the booth coincident with the slot 11 remote from that adjacent to the stop 13. The pin 24 is kept normally elevated by a spring 25, which spring would yield to pressure exerted upon the pin 24 tending to depress it. By opening the door 2 to the full extent permitted by the length of the slot 11, the lock bolt 16 is brought directly beneath the pin 24 while the lock bolt is still within the slot 11. Now, on pressing down upon the pin 24, the lock bolt 16 may be depressed below the slot 11, whereupon the door may be fully opened and, considering the depression of the pin 24 as having been sufficient, the latch 21 may swing over and lock the armature 17 against rise until the door is again fully closed.

Should side pressure be exerted upon the door, as might occur when a customer has been held a prisoner and has finally deposited the necessary amount, the central operator would have difficulty in withdrawing the lock bolt if it were in one piece with the rod 14. With the structure described, the rod 14 may be drawn to the magnet and locked by the latch 21, even though the customer be at the time pressing on the door in an endeavor to open it to the full extent. Under such circumstances, the relatively weak current in the ringing circuit, while unable to cause the withdrawal of the lock bolt 16, will readily move the rod 14 far enough for the latch 21 to engage over the head 17. Then, upon release of pressure on the door by the customer, the lock bolt 16 will drop and stay in the lowered position, so that the door may be opened and the customer permitted to leave the booth.

While provision may be made for central to apprise an authorized person near the booth that a customer is imprisoned in the booth, such notification may be made to occur automatically. For this purpose, various arrangements may be employed, and one such arrangement is shown in the drawings, especially in Fig. 2. A lever 26 is pivoted on the keeper 9 to one side of the slot 11, so that one arm of the lever traverses the slot close to that end under the pin 24 and in the path of the lock bolt 16 when projected through the slot. The lever 26 has a normal constraint in one direction imparted to it by a spring 27, so that when the bolt 16 is moved along the slot 11 to the limit of the partially open position of the door, it engages the lever 26 before such limit is reached, and rocks the lever in opposition to its normal constraint. The lever is arranged to operate any suitable type of signal device, whether audible, visual or electrical. In Fig. 2, it is assumed that the lever 26 carries on the arm remote from that traversing the slot 11, a contact 28, while another contact 29 is carried by the channel 3, so that an electric circuit represented by conductors 30 and including a signal device 31 and current source 32 may be closed by bringing the contacts 28 and 29 together when the door has been opened as far as the lock bolt 16 can travel in the slot 11. By this means, the endeavor of a customer to escape from the booth will attract the attention of the local attendant who may then go to the booth and either release the customer at once if such action be proper, or take such other action as may be found necessary.

In order to prevent tampering with the mechanism by the customer within the booth, a casing 33 is attached to the door so as to protect the locking mechanism from interference by the customer.

What is claimed is:—

1. The combination with a telephone booth provided with a door and with electrical contacts requiring the closing of the door to establish telephonic communication, of a lock for the door permitting a limited range of opening movement of the door without unlocking it, and means controllable solely from the outside of the booth to cause the lock to move from the locked to the unlocked position.

2. The combination with a telephone booth provided with a door, of locking means automatically moving to the locked position on the closing of the door, electric means for causing the locking means to move to the unlocked position and controllable from a distance, means permitting a limited opening of the door while the locking means are in the locked position, and lock operating means local to the booth and in position to actuate the locking means to the unlocked position when the door is partly open.

3. The combination with a telephone booth provided with a door, of a guide member on the door, a guide strip on the booth receiving the guiding member, a keeper in the guide strip, a lock bolt carried by the guiding member in position to engage the keeper, and electric means for releasing the lock bolt to move to the unlatched position and controllable from a distance.

4. The combination with a telephone booth having a door, of an elongated guide strip for the door, a guide on the door engaging the guide strip, a keeper in the guide strip having an elongated slot, a lock bolt carried by the guide on the door, coacting means on the keeper and guide on the door for causing the movement of the lock bolt to the locking position when the door reaches the closed position, and means operable at will for releasing the lock bolt to move to the unlatched position, with said last-named means accessible solely from the outside of the booth.

5. The combination with a telephone booth having a door, of an elongated guide strip for the door, a guide on the door engaging the guide strip, a keeper in the guide strip having an elongated slot, a lock bolt carried by the guide on the door, coacting means on the keeper and guide on the door for causing the movement of the lock bolt to the locking position when the door reaches the closed position, and electromagnetic means operable at will for causing the movement of the lock bolt to the unlocked position.

6. The combination with a telephone booth having a door, of an enlongated guide strip for the door, a guide on the door engaging the guide strip, a keeper in the guide strip having an elongated slot, a lock bolt carried by the guide on the door, coacting means on the keeper and guide on the door for causing movement of the lock bolt to the locking position when the door reaches the closed position, and electromagnetic means and mechanical means each operable at will for causing movement of the lock bolt to the unlocked position, with the electromagnetic means and the mechanical means spaced apart.

7. The combination with a telephone booth having a door, of an elongated guide strip for the door, a guide on the door engaging the guide strip, a keeper in the guide strip having an elongated slot, a lock bolt carried by the guide on the door, coacting means on the keeper and guide on the door for causing locking movement of the lock bolt when the door reaches the closed position, and electromagnetic means and mechanical means for causing movement of the lock bolt to the unlocked position at will, with the electromagnetic means and the mechanical means spaced apart, said booth being provided with contact members on a fixed part of the booth and on the door for causing the closure of the telephone circuit at said contact members when the door is fully closed.

8. The combination with an inclosure provided with a door, of locking means therefor constructed to permit a partial opening of the door and operable solely from the exterior of the inclosure, said locking means comprising a freely movable upright lock bolt having a normal tendency to gravitate to the unlocked position, means tending to elevate the lock bolt to the locking position, and other means also operable solely from the exterior of the inclosure and situated and constructed to overcome the normal tendency of the last-named means when the door is in the partially open position.

9. The combination with a telephone booth provided with a door, of locking means for the door comprising a gravity lock bolt, means having a normal tendency to move the lock bolt in opposition to gravity, and electromagnetic means for acting on the last-named means in opposition to its normal tendency.

10. The combination with a telephone booth provided with a door, of a guide member for the door, a gravity lock bolt carried by the guide member and having a normal tendency to move under the action of gravity to the unlocked position, a spring actuated rod carried by the guide member for moving the bolt in opposition to the action of gravity to lock the door, and electromagnetic means in operative relation to the rod for moving it in opposition to its normal tendency to release the lock bolt to the action of gravity.

11. The combination with a telephone booth provided with a door, of guiding means for the door, a lock bolt carried by the guiding means and movable under the action of gravity toward the unlocked position, a spring actuated rod in alinement with the bolt for moving the latter toward the locked position, electromagnetic means in operative relation to the rod for moving it in opposition to the spring for actuating it, and a gravity latch for engaging the rod when moved by the electromagnetic means.

12. The combination with a telephone booth provided with a door, of a lock bolt, a keeper therefor along which the lock bolt has a limited movement to permit partial opening of the door, and signal means positioned to be engaged by the lock bolt for producing a signal when the door is partly opened.

13. The combination with a telephone booth provided with a door, of a lock bolt on the door, means permitting the partial opening of the door when the lock bolt is in the door locking position, and signal means having a part in the path of the lock bolt for causing a signal when the door is in the partially opened position.

14. The combination with a telephone booth provided with a door, of guide means for the door, a lock bolt carried by the guide means, a keeper for the lock bolt having an elongated slot for permitting a partial opening of the door while in the locked position, and signal means provided with a member in the path of the lock bolt and yieldable thereto when the lock bolt approaches the position where the door is partly opened for causing a signal by the partial opening of the door.

In testimony that we claim the foregoing as our own, we have hereto affixed our signatures in the presence of two witnesses.
  GEORGE ERNEST THUM.
  MAX THEIMER.

Witnesses:
  GEORGE STEINBERG,
  RUDOLPH KNELL.